United States Patent
Braun et al.

(10) Patent No.: US 8,890,515 B2
(45) Date of Patent: Nov. 18, 2014

(54) DEVICE FOR DETECTING A ROTATIONAL ANGLE OF A ROTATABLE PART

(75) Inventors: Alexander Braun, Pforzheim (DE); Matthias Waibler, Remshalden-Hebsack (DE); Thorsten Droigk, Marbach am Neckar (DE); Hansjoerg Vollmer, Sandringham (AU)

(73) Assignee: Robert Bosch GmbH, Stuttgart (DE)

( * ) Notice: Subject to any disclaimer, the term of this patent is extended or adjusted under 35 U.S.C. 154(b) by 427 days.

(21) Appl. No.: 12/998,326

(22) PCT Filed: Oct. 12, 2009

(86) PCT No.: PCT/EP2009/063279
§ 371 (c)(1),
(2), (4) Date: Jun. 22, 2011

(87) PCT Pub. No.: WO2010/043590
PCT Pub. Date: Apr. 22, 2010

(65) Prior Publication Data
US 2011/0241659 A1  Oct. 6, 2011

(30) Foreign Application Priority Data
Oct. 13, 2008  (DE) .......................... 10 2008 042 795

(51) Int. Cl.
*G01B 7/30* (2006.01)
*G01D 5/14* (2006.01)

(52) U.S. Cl.
CPC ...................................... *G01D 5/145* (2013.01)
USPC ...................................................... 324/207.25

(58) Field of Classification Search
USPC ...................................................... 324/207.25
See application file for complete search history.

(56) References Cited

U.S. PATENT DOCUMENTS 5,880,586 A    3/1999  Dukart et al.
8,390,276 B2 *  3/2013  McDonald et al. ...... 324/207.25

FOREIGN PATENT DOCUMENTS

| DE | 195 43 562 | 5/1996 |
| DE | 198 49 108 | 6/2000 |
| DE | 101 60 845 | 7/2003 |
| EP | 0 842 741 | 5/1998 |
| EP | 1 014 039 | 6/2000 |
| EP | 1 617 180 | 1/2006 |
| WO | WO 96/16316 | 5/1996 |

* cited by examiner

*Primary Examiner* — Reena Aurora
(74) *Attorney, Agent, or Firm* — Kenyon & Kenyon LLP

(57) ABSTRACT

A device for detecting a rotational angle of a rotatable part, e.g., a steering wheel, includes at least one magnet, at least one sensor which detects the magnetic field of the magnet, at least one housing in which the sensor and/or the magnet is/are movably situated relative to one another, and at least one printed circuit board which is contacted in an electrically conductive manner by at least one connecting element of the sensor. The printed circuit board has at least one interface or a connector plug from which the output signal of the sensor or an output signal derived therefrom is relayed to an evaluation unit which ascertains the absolute position of the rotational angle as a function of the output signal.

17 Claims, 7 Drawing Sheets

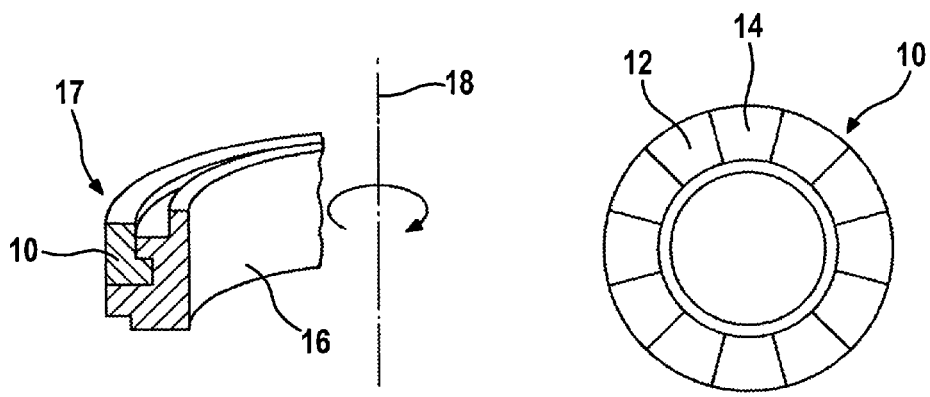
FIG. 1
FIG. 2
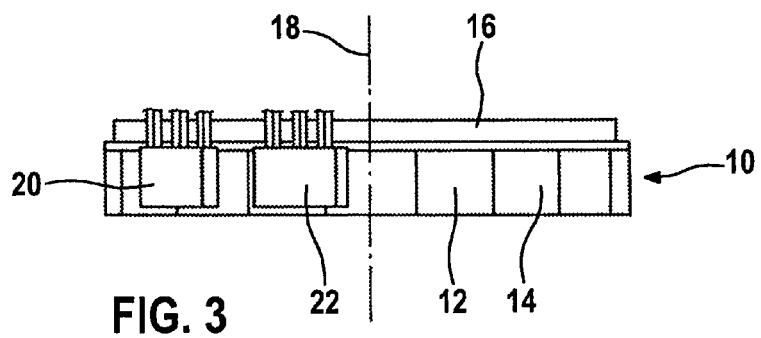
FIG. 3
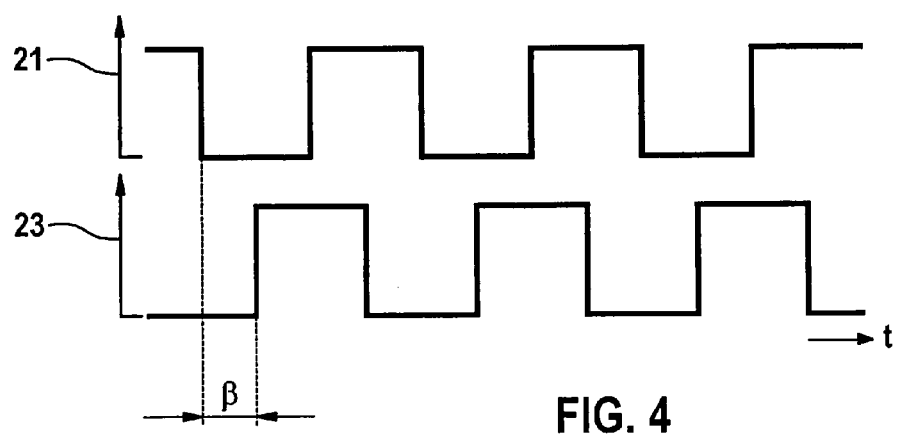
FIG. 4

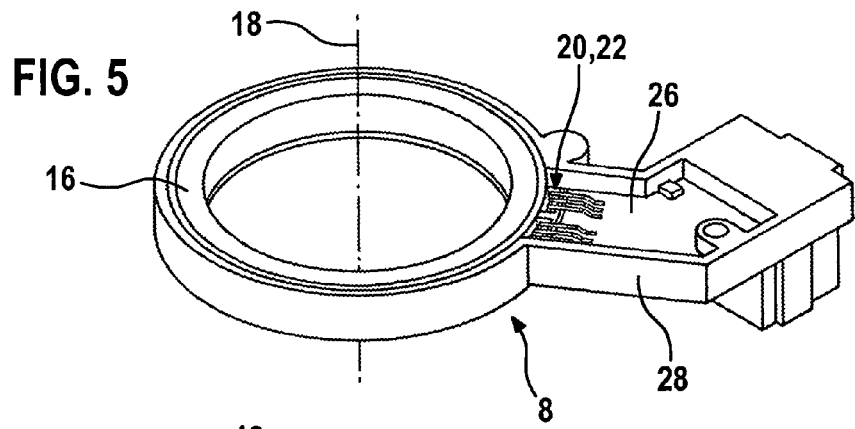
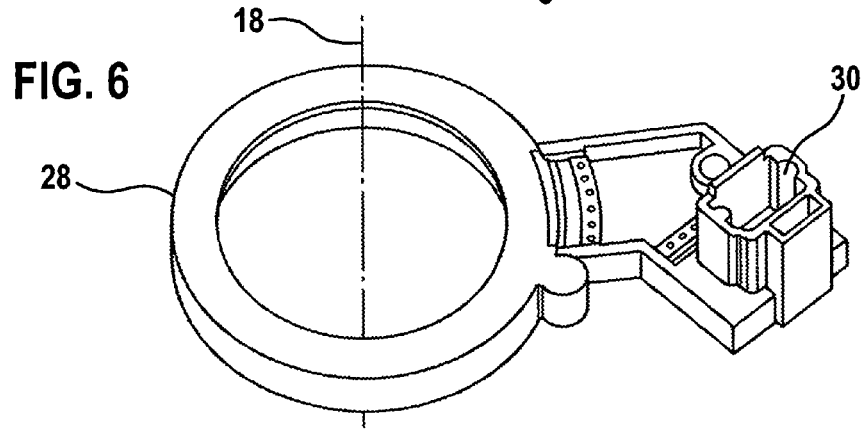
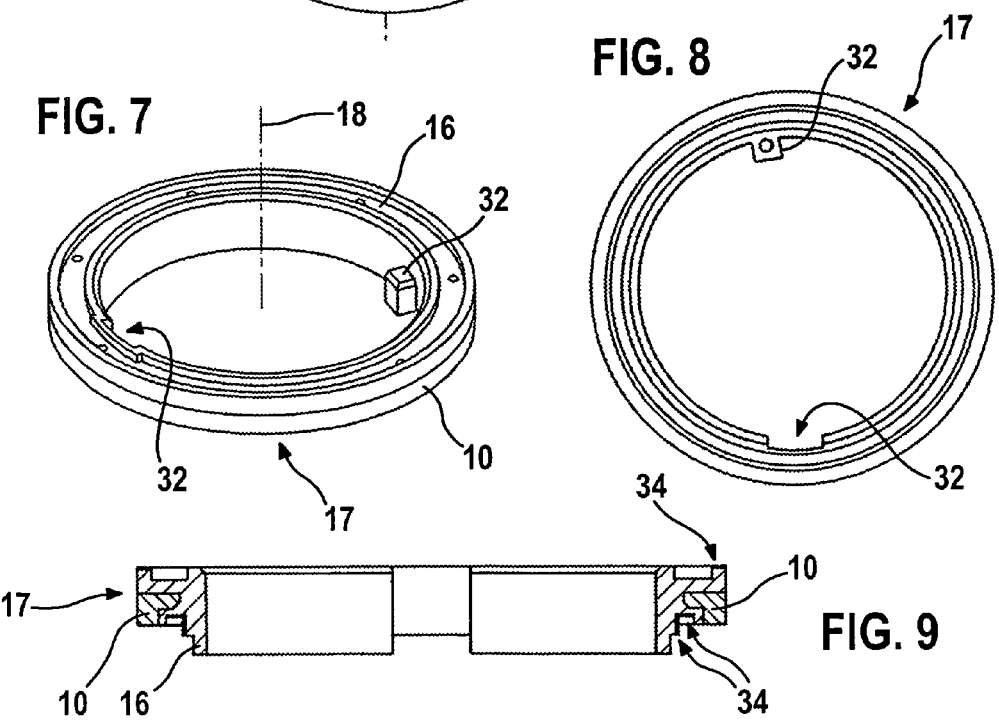

DEVICE FOR DETECTING A ROTATIONAL ANGLE OF A ROTATABLE PART

BACKGROUND OF THE INVENTION

1. Field of the Invention

The present invention relates to a device for detecting a rotational angle of a rotatable part.

2. Description of Related Art

A generic system for contactless detection of a rotational angle of a rotatable element is known from published German patent application document DE 195 43 562 A1. In order to easily detect the absolute rotational position of the rotatable element, the sensor system is made up of at least two sensor elements, and is situated relative to the rotatable element in such a way that in any rotational position, the field lines emanating from the rotatable element extend transversely with respect to the sensor structures specified by the direction of a current in the sensor elements. Using various electronic evaluation devices, the directional components of the field lines may be evaluated for ascertaining the rotational position by evaluating the phase position between input signals and output signals of the particular sensor elements. Either sinusoidal or square alternating voltages or direct current voltages are supplied as input signals.

An object of the present invention is to further simplify the device for detecting a rotational angle.

BRIEF SUMMARY OF THE INVENTION

The device according to the present invention for detecting a rotational angle of a rotatable part has the advantage over the related art that, due to the relative detection of the rotational angle, it is not necessary to spatially integrate internal evaluation units, for example microcontrollers, etc., directly into the sensor in order to compute an absolute steering angle. A more compact installation space may also be achieved in this way. Corresponding subsequent steps such as calibration of the sensor during fabrication in the manufacturing plant are dispensed with. This results in lower manufacturing and assembly costs. Compared to sensors having optical measuring elements, the device according to the present invention is very robust, since the relatively rapid loss of its accuracy or function due to the possible penetration of contaminants no longer occurs.

In one advantageous refinement, a further sensor is provided for detecting the magnetic field of the magnet, the sensor being situated at a distance from the first sensor in such a way that an output signal results which is phase-shifted with respect to the output signal of the other sensor. In addition to the relative change in position, it is then also possible to detect the direction of rotation. By placing further sensors around the magnet, the resolution may also be increased without the need to make extensive changes to the measuring principle or design. For this purpose it is necessary to provide only one linkage means, preferably on the printed circuit board, which links the two output signals to an output signal having higher resolution by using logical operations (AND and OR gates). This involves little complexity. On the other hand, it is necessary to relay only one output signal to the evaluation unit, thus reducing the cabling complexity.

In one advantageous refinement, a device is provided, preferably on the printed circuit board, for shifting the signal level of at least one output signal of a sensor. It is particularly advantageous to select the signal levels of the sensors in such a way that in normal operation they differ from the voltage levels of the supply voltage or ground. A malfunction in the sensor may be deduced in a particularly simple manner solely on the basis of the signal level. For this purpose it is particularly advantageous to provide an error recognition unit in the evaluation unit which, on the basis of the signal level of at least one of the output signals, recognizes whether an error is present in one of the sensors.

In one advantageous refinement it is provided that at least one connecting element of the sensor has at least one bending region. This bending region is used in particular to compensate for voltages, for example as the result of thermal stress. The mechanical stability of the system may be further increased in this way. In one advantageous refinement, a connecting element of the sensor has at least one further bending region. In this way the connecting element for the electrical contacting may be attached to the printed circuit board in a suitable manner, for example by soldering. The device may thus be manufactured more easily, while at the same time the mechanical strength is increased.

In one advantageous refinement, at least one retaining element is provided for absorbing mechanical stresses which act on the sensor. The retaining element is designed in the form of ribs on the housing or on a part connected to the housing. This retaining element absorbs mechanical forces which act on the sensor, thus allowing the robustness of the device to be further increased. In addition, the sensor or its connecting elements may be fixed to the housing by melting the retaining ribs, for example by hot caulking or laser action, which further increases the strength.

In one advantageous refinement, at least one pocket or recess is provided in the housing for accommodating the sensor. The sensor may be precisely positioned in this way, in particular when even further sensors are to be situated relative to one another with high precision in order to achieve a defined phase shift of their output signals. The sensor is preferably situated in such a way that it senses a magnetic field of the magnet which extends essentially parallel to the rotational axis of the rotatable part. The installation height of the device may be kept low in this way. In one advantageous refinement, at least one fastening means is provided in the housing for connecting the printed circuit board to the housing. The printed circuit board may be precisely positioned in this way. For fastening the housing to the printed circuit board, the fastening means preferably has a thermally deformable design, for example with the aid of hot caulking. Thus, the fastening process might be carried out together with the retaining ribs in only one operation. In one advantageous refinement, at least one rivet connection is provided as the fastening means. This rivet connection is used in particular for absorbing forces which act on the printed circuit board, for example forces introduced via the connector plug. The stability and robustness of the system are thus further increased.

In one advantageous refinement, the integrated component formed from the hub and the magnet is produced by extrusion coating the magnet using plastic. In this way even further, more complex geometries may be easily achieved in this component.

It is particularly advantageous for the magnet to have an essentially L-shaped cross section. The hub may thus be integrated together with the magnet, resulting in greater strength for producing an integrated component.

In one advantageous refinement, the hub has at least one carrier for transmitting a rotational motion of the rotatable part, preferably a steering column. A component or a recess which extends in the radial direction toward the rotational axis of the rotatable part is provided as the carrier. The integrated component might be installed from the top or the bottom, depending on the configuration of the housing, without having to adapt the housing to different installation spaces. For the same components, this increases the flexibility of the system.

In one advantageous refinement the hub has at least one bearing surface, which is preferably oriented perpendicular to the rotational axis, for rotatably supporting the hub in the housing. At least one bearing surface of the hub is preferably made of a wear-resistant material. The bearing surfaces may thus be selected independently of the geometry of the magnet in such a way that an optimal solution results with regard to the interplay with the housing (fit, tolerances, ease of installation, etc.). In addition, more complex structures may be implemented for the hub. The hub is advantageously made of the same material as the magnet, preferably plastic or a fully magnetizable material. The manufacture of the component may be further simplified in this way.

In one advantageous refinement, the hub and/or the magnet cooperate(s) with a fixing element for fixing to the housing. It is particularly advantageous when the fixing element allows a motion of the magnet or of the hub in the direction of rotation, but prevents a motion parallel to the rotational axis in the installed state. The fixing element has a movable or elastic design, preferably as a snap hook, and/or is connected to the housing or to the hub.

A snap hook which fixes the hub in both the axial and radial directions is particularly suitable as a fixing element. However, after the installation process the snap hooks are free of force or tension, so that they do not limit the mobility of the hub or the magnet with respect to the housing. The number of snap hooks is advantageously selected in such a way that the hub is still reliably fixed even if a hook fails, for example due to breakage. For example, five snap hooks are uniformly distributed around the circumference of the hub to achieve this functionality. The operational reliability of the device may be further increased in this way. In addition, due to the snap hook, a cover for axially fixing the hub is unnecessary, so that components may be spared.

BRIEF DESCRIPTION OF THE DRAWINGS

FIG. 1 shows a perspective view of a hub having an integrated magnet (without bearing geometry).

FIG. 2 shows a top view of a multipole magnet.

FIG. 3 shows a perspective view of the system made up of the hub, magnet, and sensors.

FIG. 4 shows the output signals of the two sensors as a function of time.

FIG. 5 shows a perspective view of the device for detecting a rotational angle, from above.

FIG. 6 shows the system according to FIG. 5 from below.

FIG. 7 shows a perspective side view of the hub together with integrated carriers.

FIG. 8 shows the hub of FIG. 7 in the top view.

FIG. 9 shows the systems according to FIGS. 7 and 8 in a sectional view.

DETAILED DESCRIPTION OF THE INVENTION

Figure 10:
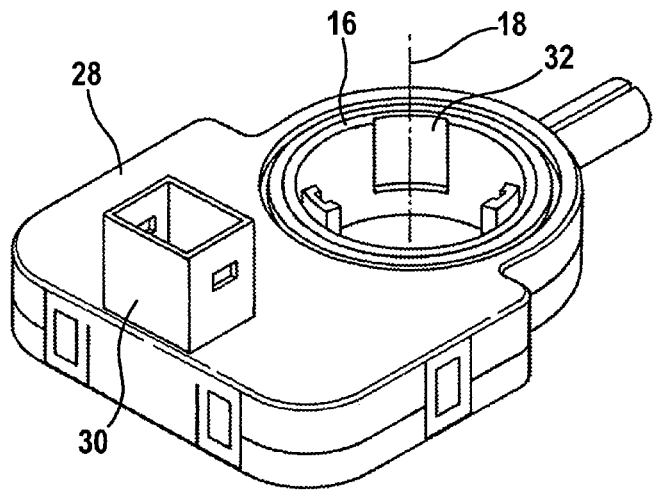
FIG. 10 shows a perspective view of the device for detecting a rotational angle, with an inserted hub.

A magnet 10 is situated in the upper, outer circumferential region of an annular or hollow cylindrical hub 16, thus forming an integrated component 17. Magnet 10 is designed as a multipole magnet, as illustrated in FIG. 2, which shows magnet 10 in the top view. To improve the connection of magnet 10 to hub 16, a projection is provided at the bottom of magnet 10 which in this region extends slightly farther in the direction of rotational axis 18 of hub 16 than in the upper region thereof. Hub 16 and magnet 10 are engaged with, for example, a steering column or another part which is connected to the steering wheel. The part which rotates during the steering motion, for example the steering column, is connected via a carrier 32 to hub 16, which is situated in device 8 for detecting the rotational angle. The rotational motion of the part is thus transmitted directly to hub 16. Hub 16 contains magnet 10, which is designed as a multipole magnet. The magnet bears north poles 12 and south poles 14 which are distributed in alternation over its circumference. Thus, during rotation of the steering column, multipole magnet 10 co-rotates at the same angular velocity. This provides the option of placing a sensor 20 at a certain location in the measurable range of the magnetic field which provides measured values which are a function of the magnetic field direction at that location, or which may be deduced from same. For this purpose a Hall sensor might be used as sensor 20, which emits a binary signal depending on whether its sensitive range is predominantly in the area of influence of a north pole 12 or of a south pole 14. It is important that sensor 20 and magnet 10 are movably situated relative to one another. The sensor might also be designed as a Reed contact which modifies its output signal as a function of the magnetic field.

Using only one sensor 20 would allow the relative rotational angle of the steering column to be ascertained, but not the direction of rotation. Therefore, a further sensor 22 is provided which is placed at a defined distance from first sensor 20 so that a certain shift β of the two output signals 21, 23 of the two sensors 20, 22, respectively, results. It may be deduced on the basis of the time sequence of signal edges 21, 23 whether the steering wheel, i.e., the steering column, is rotated in the clockwise or counterclockwise direction. Sensors 20, 22 have been situated farther radially outward relative to magnet 10 so that they detect the magnetic field of the magnet in the radial orientation.

In order to supply sensors 20, 22 with the necessary operating voltage and to provide their output signals 21, 23 to the requesting systems, for example a control unit 58 of an electronic stability program, electronic components are required. These electronic components are mounted on a printed circuit board 26 and electrically connected. Additional functions, such as for changing the voltage level, may be implemented at that location if necessary.

Hub 16, magnet 10, sensors 20, 22, and printed circuit board 26 are accommodated in a housing 28, which via an integrated connector plug 30 allows connection to the power and communication network of the motor vehicle. Housing 28 also carries out other functions, for example supporting hub 16 together with magnet 10, axial fixing using fixing elements 36, or further attachment functions of sensors 20, 22 via retaining elements 50, to be discussed below.

In principle it would also be possible to measure the field of magnet 10 in the axial direction relative to rotational axis 18. Sensors 20, 22 would then need to be situated above or below magnet 10, not lateral to same, in order to detect the magnetic field of the sensor in the axial direction.

A key aspect of device 8 according to the present invention for detecting a rotational angle is the integration of magnet 10 into hub 16. This might be achieved, for example, by extrusion coating of magnet 10 using plastic. By a suitable selection of the material, the resulting combined component of magnet 10 and hub 16 may be designed in such a way that wear-free or wear-resistant support of hub 16 in housing 28 is achieved. The suitable selection of the material of hub 16 also depends on the material of housing 28; examples of possible suitable materials are polyamide (PA12) and polybutylene terephthalate (PBT).

As is apparent from FIG. 9, bearing surfaces 34, which cooperate with corresponding counterbearing surfaces of housing 28, may be selected independently of the geometry of magnet 10 in such a way that an optimal solution may be found with regard to the interplay with housing 28 (fit, tolerances, ease of installation). The bearing for housing 28 is formed by two bearing surfaces 34 whose cross sections are perpendicular to one another, as a result of which hub 16 is aligned relative to rotational axis 18 in the axial and radial directions. A third bearing surface 34 at the upper edge of the outer circumference of hub 16 cooperates with fixing element 36, described below. It is also provided that at least one carrier 32 is integrated into hub 16. Two types of carriers 32 are shown in FIGS. 7 and 8 as examples. In the first type, a recess which is outwardly oriented in the radial direction is provided at the inner side of hub 16, in which a complementary projection of a rotatable part, for example the steering column, is able to engage. In the second type, a further carrier 32 is provided which has a projection which is oriented from the inner side of hub 16 toward rotational axis 18 and which cooperates with a corresponding recess in the rotatable part.

The combined module made up of hub 16 and magnet 10 is particularly advantageous, since more complex geometries may also be implemented at hub 16, for example elastically resilient snap hooks. A connection with housing 28 may be established using such snap hooks. Alternatively, the same material used for multipole magnet 10 might also be used for hub 16, thus simplifying production of the component. For example, the hub might then be produced as a component with the aid of an injection molding process. Another alternative is to design hub 16 as a component having symmetrical bearing points, as the result of which integrated magnet 10 would be centrally situated.

Figure 11:
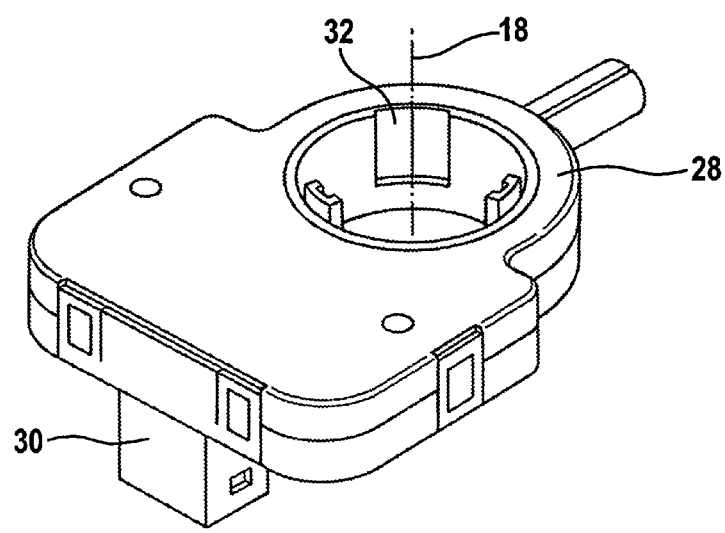
FIG. 11 shows the device according to FIG. 10, having a hub inserted from the opposite direction.

For attaching device 8 for detecting a rotational angle to the movable part such as the steering column, for example, carrier elements 32 are always necessary, which are mounted on one side of hub 16. If it is then necessary for space reasons to install housing 28 in the inverted position, for example because connector plug 30 is oriented in the opposite direction, it is only necessary to likewise install hub 16 of device 8 in the inverted position. Thus, two variants of the same device are provided without changing hub 16 or magnet 10. These options are shown in FIGS. 10 and 11, in both cases hub 16 being oriented in the same way regardless of the position of connector plug 30.

Another special characteristic of device 8 is the attachment of hub 16 to housing 28, which is carried out with the aid of fixing elements 36. To prevent hub 16 together with magnet 10 from moving out of housing 28 in the axial direction, the hub and magnet must be fixed in the axial direction. For this purpose fixing elements 36 are provided, which preferably are designed as snap hooks or clips. For these fixing elements 36 it is important that on the one hand they allow motion of hub 16 about rotational axis 18, but on the other hand they prevent displacement, with a defined play, in the axial direction. Fixing elements 36 surround hub 16 in a circle. When hub 16 is inserted into housing 28, counterforces which occur when fixing elements 36 are bent away must first be overcome. If hub 16 has reached its end position, fixing elements 36 spring back over the hub, so that fixing elements 36 are completely free of force or tension. Hub 16 is thus able to rotate without generating undesired friction on fixing elements 36. Fixing elements 36 are selected with regard to their number and placement in such a way that hub 16 is secured over more than half of its circumference, whereby, even if a fixing element 36 fails, the axial fixation is maintained. In addition, as a result of this approach there is no need for a cover, which otherwise would be necessary for securing hub 16, and there is likewise no need for fastening means such as screws or rivets, for example, required for this purpose.

Figure 12:
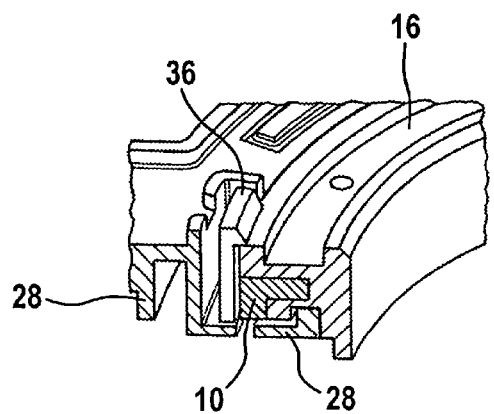
FIG. 12 shows a perspective half section of the connection of the hub to the housing via fixing elements.

One example of a geometric configuration of a fixing element 36 with respect to hub 16 is shown in FIG. 12. Fixing element 36 is directly or indirectly connected to housing 28. For installation, hub 16 is inserted into housing 28 from above, and via the bevel pushes the tip of snap hook 36 outward. In the end position, hub 16 then rests on the countersurface of housing 28. Snap hook 36 then springs back and counteracts axial displacement of hub 16. Fixing element 36 is situated at a radial distance from the outer side of hub 16 and magnet 10. The bottom side of snap hook 36 cooperates with the exterior top side of hub 16, which is designated as bearing surface 34 in the top right side of FIG. 9.

Instead of snap hooks having a defined geometry as possible fixing elements 36, elastically supported fixing elements 36 might be used. The "spring" and "secure" functions may also be distributed over more than one element. Alternatively, it would be possible to mount fixing elements 36 not on hub 16 or housing 28, but, rather, on an additional component used for mutually connecting hub 16 and housing 28. Fixing elements 36 might also be situated on the outer side of hub 16 and elastically engage in corresponding recesses in housing 28.

Figure 19:
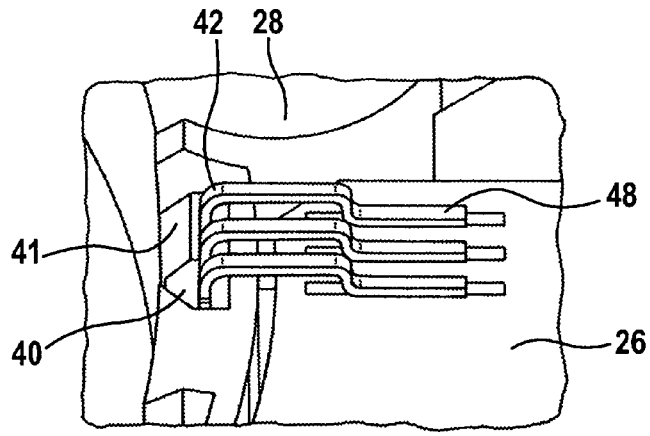
FIG. 19 shows a perspective view for contacting the connecting elements of the sensor with the printed circuit board.
Figure 20:
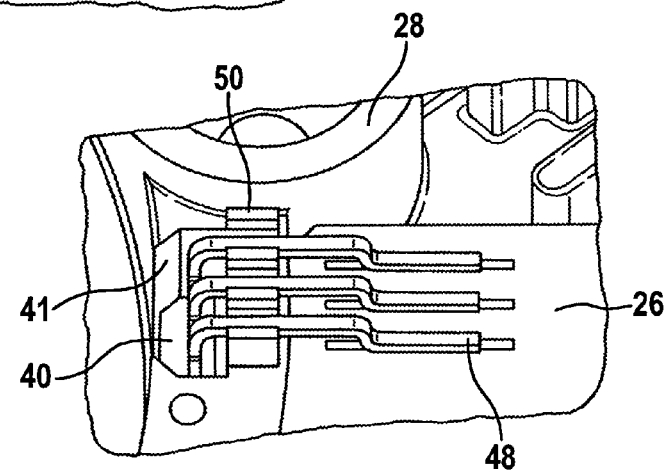
FIG. 20 shows a perspective view for fixing the sensor using fastening ribs, prior to melting.

Sensors 20, 22 are made up of a housing 40 and multiple connecting elements 42, via which the signals of the electronic components inside housing 40 are guided. Sensors 20, 22 must be situated in housing 28 in a fixedly defined position relative to one another and to magnet 10. For this purpose, pockets 41 are provided in housing 28 which are matched to the outer contour of housing 40 and allow defined positioning. Such pockets 41 are shown in FIGS. 19 and 20. Connecting elements 42 of sensors 20, 22 are bent by approximately 90 degrees (reference numeral 43) in order to electrically contact radially oriented sensors 20, 22 with printed circuit board 26. Sensors 20, 22 are preferably designed as so-called through hole technology (THT) components, and are used in the same way as a surface mounted technology (SMT) component. This allows measurement of the magnetic field of magnet 10 perpendicular to the orientation of the usable surfaces of printed circuit board 26. In addition, further bending regions 44, 46 of connecting elements 42 are provided.

Figure 13:
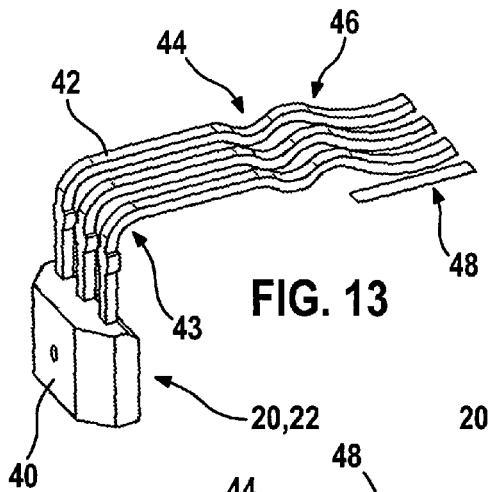
FIGS. 13 through 18 show sensor elements, in each case having different shapes of connecting elements.

As shown in FIG. 13, after housing 40 is fixed and connecting elements 42 are soldered to printed circuit board 26, a first bending region 44 is used to compensate for voltages which may result, for example due to alternating thermal load during operation. A second bending region 46 is connected thereto, via which connecting elements 42 are guided to printed circuit board 26 in such a way that the bending region is wetted with solder in the most effective manner possible and may thus be electrically and mechanically connected to printed circuit board 26 in a contacting area 48. In the exemplary embodiment according to FIG. 13, this results in an essentially S-shaped curve of connecting elements 42.

Figure 14:
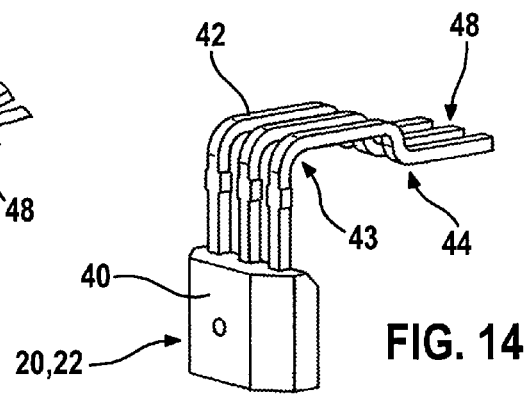

The exemplary embodiment according to FIG. 14 also includes a first bending region 44 in order to guide connecting elements 42 into the contacting areas, essentially parallel to the surface of printed circuit board 26.

Figure 15:
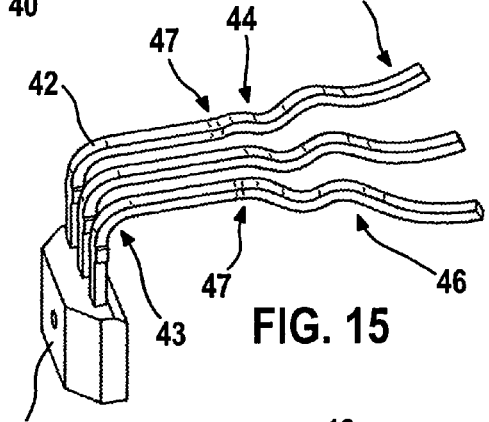
Figure 16:
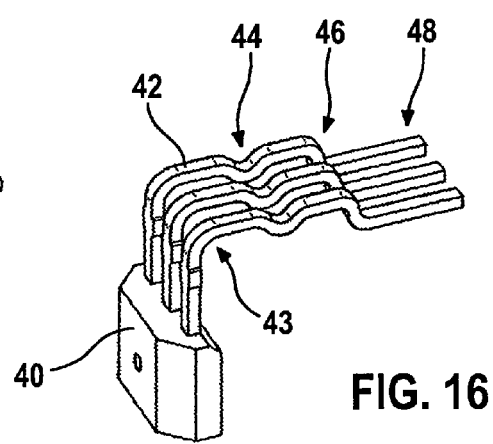
Figure 17:
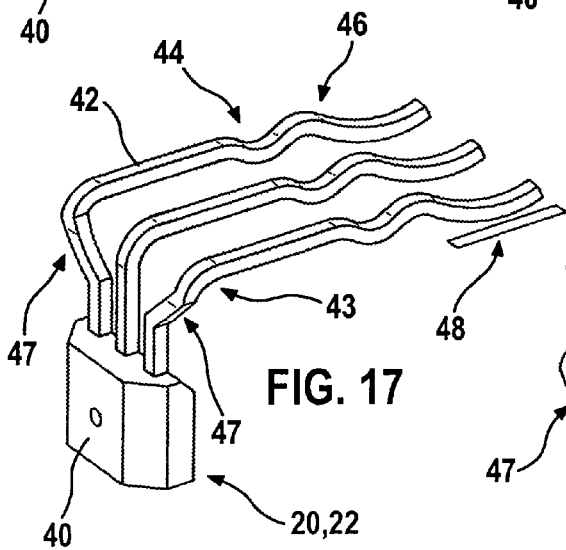
Figure 18:
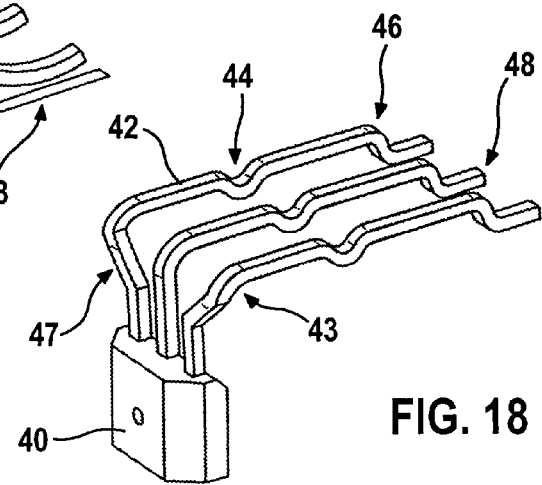

Alternatives are possible. Thus, 90-degree bend 43 in the vicinity of housing 40 might be dispensed with when it is necessary to detect the magnetic field in the axial direction instead of in the radial direction, as described. 90-degree bend 43 might also be replaced by a different angle. Alternatively, first bending region 44 might be dispensed with, as illustrated in FIG. 15, if this is necessary for relevant reasons, for example cost or feasibility. Alternatively, second bending region 46 might also be dispensed with, and the contacting with printed circuit board 26 might be achieved in a manner other than soldering, for example using a mechanical snap-in plug which is already mounted on printed circuit board 26 and into which connecting elements 42 are inserted. Similar embodiments are illustrated in FIGS. 14 and 16. Second bending region 46 might likewise be dispensed with if this is necessary due to the selected soldering process or for other reasons, in order to guide connecting elements 42 in a straight line to the end (FIGS. 14, 16). Optionally, a third bending region 47 for the two outer connecting elements 42 might be provided in order to increase the distance between connecting elements 42, if this is necessary due to the selected soldering process or for other reasons. In another variant according to FIG. 18, the two outer connecting elements 42 are bent outwardly in a third bending region 47, and after a 90-degree bend 43 extend essentially parallel to the surface of printed circuit board 26, and via first bending region 44 undergo a V- or U-shaped bend, and then once again extend essentially parallel to the surface of the printed circuit board until step-shaped second bending region 46 once again aligns contacting areas 48 parallel to printed circuit board 26 in the immediate vicinity thereof for suitable contacting. In principle, other sensor elements 20, 22 might also be bent in this way if they are to be used in the sensor, such as Reed contact sensors, for example.

Sensor 20, 22 according to FIG. 14 is situated in pocket 41 in housing 28, and is connected in an electrically conductive manner to printed circuit board 26 via contact regions 48 (FIGS. 19, 20). To further improve the fastening of sensor elements 20, 22 to housing 28, rib-shaped retaining elements 50 are preferably provided on housing 28 which are matched to the outer geometries of connecting elements 42. This is because during use of device 8 for detecting a rotational angle, forces occur which may act on connecting elements 42 of sensor 20, 22. The soldered connection would have to absorb these forces, which might adversely affect its service life if the forces were not absorbed at another location. Alternatively, housing 40 of sensor 20, 22 might also be stressed in such a way that connecting elements 42 in or on housing 28 might be damaged, for example by being broken off. For this reason, so-called caulking ribs 50 are provided on housing 48, along connecting elements 42, as retaining elements. When sensor 20, 22 is inserted into pocket 41 in housing 28, connecting elements 42 are first passed between ribs 50, thus being guided and allowing better matching of connecting elements 42 and printed circuit board contacting areas. For the hot caulking, the plastic is then locally melted to ribs 50, and as the result of application of force, using a punch, for example, connecting elements 42 are fixed by the solidifying plastic. The material is thus able to absorb the above-mentioned forces, so that there is little or no stress on the soldered connection or housing 40 of sensor 20, 22. In FIG. 20, corresponding ribs 50 are shown prior to melting. Alternatively, it might be provided that the material of ribs 50 is melted not by hot caulking, but with the aid of some other method, for example laser action. In another alternative embodiment it is possible not to melt material, but instead to fix the legs to housing 28 in another way, for example using an adhesive or other mechanical components. Alternatively, the fixing function might be achieved using an additional component which is mounted on housing 28.

Figure 21:
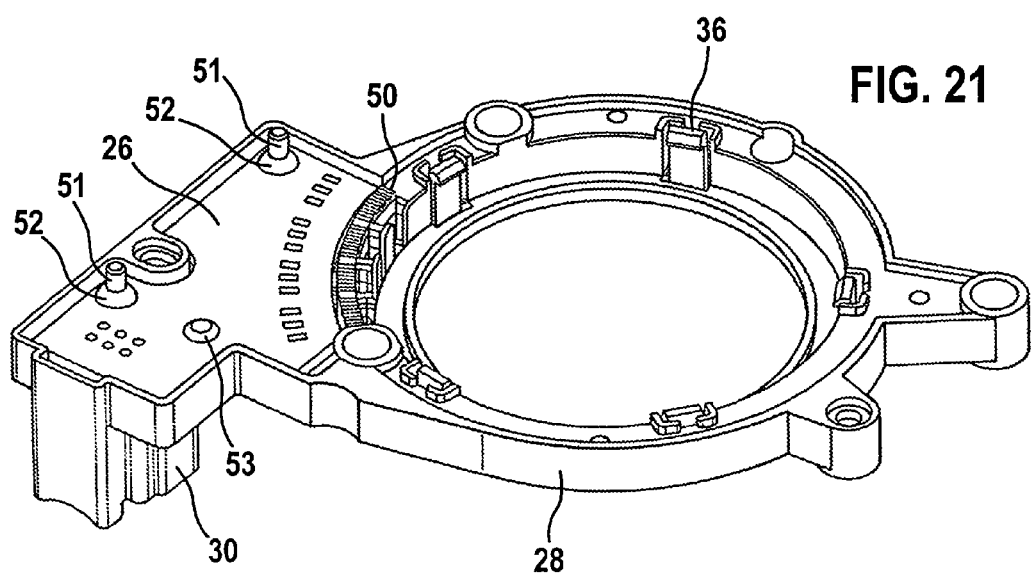
FIG. 21 shows a perspective view of the housing together with the printed circuit board.

In the perspective view according to FIG. 21, housing 28 is illustrated together with printed circuit board 26, but without integrated part 17. Printed circuit board 26 may be fastened to housing 28 via two pins 51. These pins 51 are part of housing 28, and are thus made of the same material as the housing. Printed circuit board 26 is pressed into housing 28 in order to be fastened via these pins 51. Printed circuit board 26 is correctly positioned in this way. The height of pins 51 is preferably designed in such a way that sufficient material is available to make use of this additional material for fastening printed circuit board 26 via hot caulking. The corresponding curved shape of the pins after deformation, preferably by hot caulking, is denoted in each case by reference numeral 52. A rivet connection 53 is also provided which in particular absorbs forces which occur at connector plug 30 and are transmitted to printed circuit board 26.

Rivets 53 are preferably made of metal. In addition, the annular bearing surface of housing 28 for supporting hub 16 on lower bearing surfaces 34 thereof is seen particularly well in this view.

Figure 22:
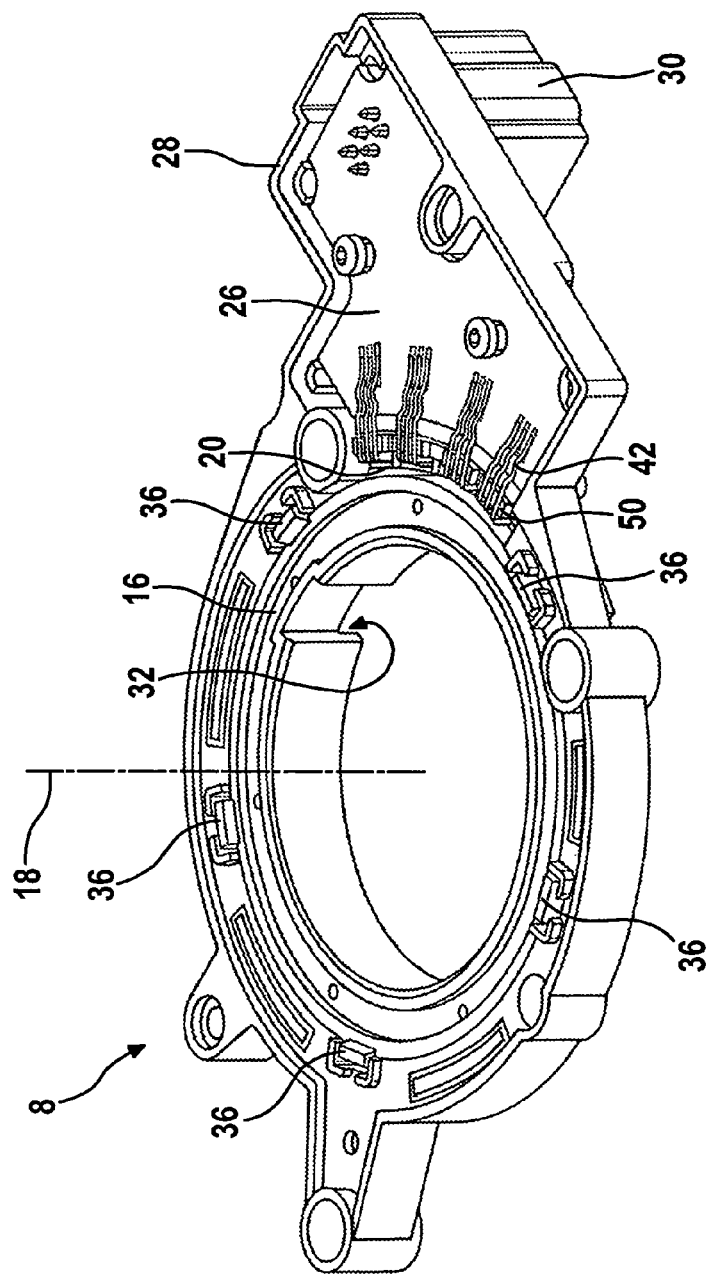
FIG. 22 shows a perspective overall view of the device for detecting a rotational angle.

The perspective view according to FIG. 22 shows in an overall view all components previously described. Hub 16 together with integrated magnet 10, which in this view is not visible, is rotatably supported in housing 28 via fixing elements 36 and corresponding bearing surfaces 34. Displacement in the axial direction of hub 16 is not possible, since the bottom side of snap hooks 36 together with top side of hub 16 counteracts axial displacement. Recess 32 at the inner side of hub 16 is visible, which cooperates as a carrier 32 with a steering column (not shown). Four sensors 20, 22, for example, are distributed in the circumferential direction, and detect the magnetic field of magnet 10 in the radial direction and optionally send appropriate output signals via connecting elements 42 to other components of printed circuit board 26, not specified in greater detail. The resolution of device 8 might be further increased by using additional sensors which are suitably positioned. On the other hand, for this purpose a third and fourth sensor might be used whose two output signals are provided to a different system, for example one pair having adjusted voltage levels, and the other pair without adjustment.

To improve the connection of sensor elements 20, 22 to printed circuit board 26, on the one hand appropriate bending regions 44, 46, 47 are provided in particular to compensate for thermal voltages. On the other hand, retaining elements 50 are also provided which absorb mechanical forces which act on sensor elements 20, 22 or their connecting elements 42. As described, these retaining elements might be designed as ribs 50.

As a further key aspect of device 8 for detecting a rotational angle of a rotatable part, instead of an absolute measurement, which is otherwise customary, a relative measurement of the motion of a steering column is provided. Only a single sensor is necessary for this purpose. In addition to the relative rotational angle of the steering column, the direction of this rotation may also be detected as the result of providing two sensors 20, 22. When the steering wheel rotates, pulsed output signals are generated, as is apparent in the signal curves according to FIG. 23. By using appropriate AND or OR gates, as shown in linkage 56, the two output signals 21, 23 may be combined into a single pulsed output signal 54. When the steering wheel rotates, the appropriate signal sequences are generated which may be associated with a rotational angle on the basis of defined characteristics. The number of pulses is therefore directly proportional to the angle by which the steering wheel moves. With the aid of a downstream evaluation unit 60 which is separate from device 8 for detecting a rotational angle, the absolute angle may be ascertained with sufficient accuracy and communicated to the requesting systems, such as a control unit 58, for example. An algorithm is also necessary, via which the neutral position of the steering wheel is to be ascertained to allow initialization of the relative detection. This algorithm is likewise executed in evaluation unit 60. This algorithm is known to one skilled in the art, and is not further discussed below. Thus, in present device 8 only the output signals of sensors 20, 22, which are designed as binary signals as a function of the type of magnetic field, or signal 54 which is linked therefrom, is/are transmitted to control unit 58. Only at that location is the absolute position of the steering wheel ascertained in a microcontroller 60, as an example of an evaluation unit.

Figure 24:
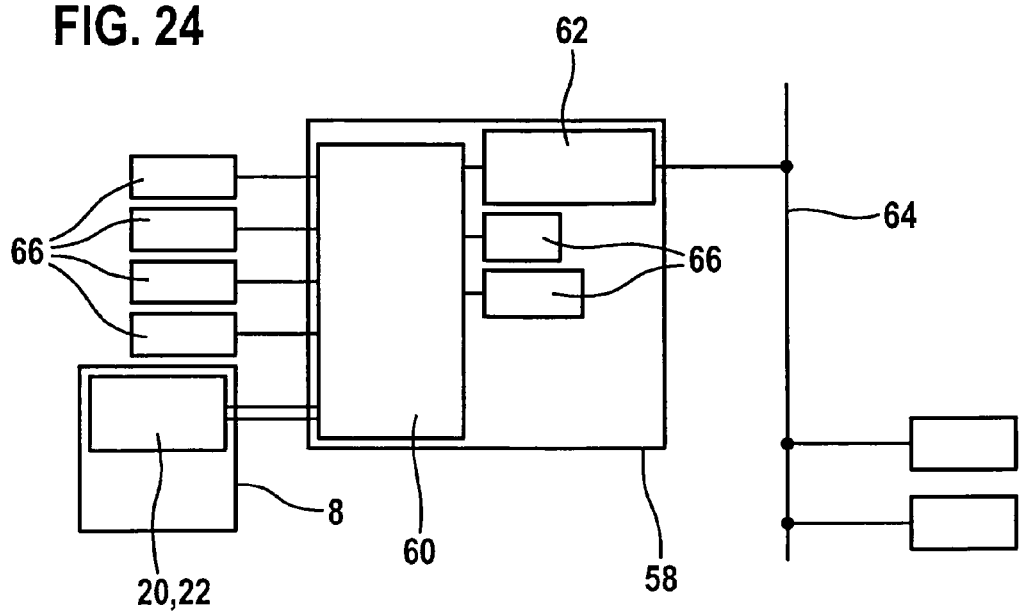
FIG. 24 shows a block diagram of the system for signal processing.

Control unit 58 or microcontroller 60 also has an appropriate interface to device 8. The absolute steering angle information ascertained in microcontroller 60 may optionally be relayed via a bus system 64 to further control units, not described in greater detail. Additional sensors 66 may be integrated into control unit 58, the values from which are also required by microcontroller 60, for example for computing appropriate control variables for an electronic stability program in a motor vehicle. Wheel speed signals of further wheel speed sensors 66 are also delivered to control unit 58, as likewise shown as an example in FIG. 24.

Device 8 for detecting a rotational angle represents a safety-relevant component in the vehicle, for which reason emitted signals 21, 23 must be checked for correctness. For this purpose electronic components are mounted on printed circuit board 26 which shift the binary output signals of sensors 20, 22 to offset levels. Instead of, for example, 5 V and 0 V (as a typical pull-up voltage and ground potential, respectively), the signals are converted to 4.5 V and 0.5 V. If a short circuit on the supply voltage or ground is then present in sensor 20, 22, these variables are also output by sensor 20, 22, i.e., in the referenced error case, 5 V and 0 V. The downstream system, for example microcontroller 60, is able to immediately recognize that an error is present in device 8, since the signal levels differ from the expected signal levels. For this purpose, microcontroller 60 compares the output signals of sensors 21, 23 which are modified by the above-mentioned electronic components, or optionally linked output signal 54, to corresponding limiting values, and in the event of a positive or negative deviation recognizes an error of sensor 20, 22. This might also be achieved using a current signal.

Figure 23:
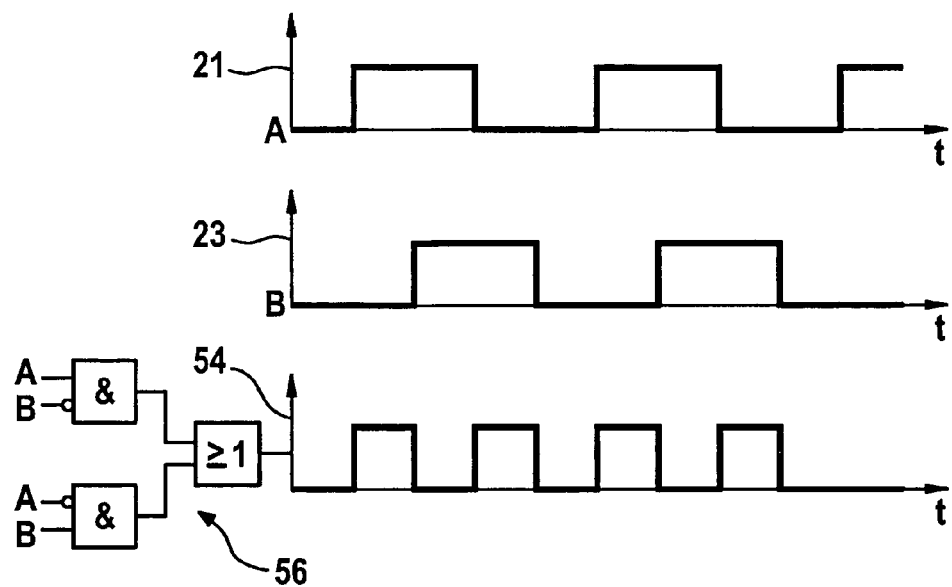
FIG. 23 shows output signals of the first and second sensors, as well as the output signal which results after one possible logical operation.

Linkage 56 on printed circuit board 26, previously explained with reference to FIG. 23, must also be provided for achieving higher resolution. A new output signal 54 is thus generated which allows a higher resolution of the rotational motion of the steering wheel.

The described device for detecting a rotational angle may be used for numerous applications. It is particularly suited for detecting a steering angle. The steering angle is already necessary in a number of vehicle functions, for example the electronic stability program, adaptive cruise control, Park Pilot, driver fitness monitoring, active front steering, all-wheel steering, adaptive lighting control, or electrohydraulic steering. However, the use is not limited thereto.

What is claimed is:

1. A device for detecting a rotational angle of one of a steering wheel or a steering column of a vehicle, comprising:
    at least one magnet;
    at least one first sensor configured to detect the magnetic field of the magnet, and wherein the magnet and the first sensor are movably situated relative to one another;
    at least one housing, wherein at least one of the magnet and the first sensor is situated in the housing;
    at least one printed circuit board contacted in an electrically conductive manner by at least one connecting element of the first sensor, the printed circuit board having one of an interface or a connector plug;
    an evaluation unit situated at a distance from the housing, wherein one of an output signal of the first sensor or a signal derived from the output signal of the first sensor is relayed from the one of the interface or the connector plug of the printed circuit board to the evaluation unit, and wherein the evaluation unit is configured to ascertain the absolute position of the rotational angle of the one of the steering wheel or the steering column as a function of the output signal of the first sensor; and
    a second sensor configured to detect the magnetic field of the magnet, the second sensor being situated at a distance from the first sensor and outputting an output signal phase-shifted with respect to the output signal of the first sensor, wherein the at least one printed circuit board includes at least one linkage unit which gates the two output signals of the first and second sensors to form a gated output signal.

2. The device as recited in claim 1, wherein the printed circuit board includes a signal-level-shifting device configured to shift the signal level of at least one output signal of at least one of the first sensor and the second sensor.

3. The device as recited in claim 2, wherein the signal-level-shifting device shifts the signal level of at least one output signal of at least one of the first sensor and the second sensor to a potential which differs from one of supply potential or ground potential of the at least one of the first sensor and the second sensor.

4. The device as recited in claim 2, further comprising:
    a third sensor providing an output signal having a signal level differing from signal levels of the output signals of the first and second sensors.

5. The device as recited in claim 2, wherein the gated output signal has a higher resolution.

6. The device as recited in claim 2, wherein the evaluation unit includes an error recognition unit configured to recognize whether an error is present in at least one of the first and second sensors on the basis of the signal level of at least one of the output signals of the first and second sensors.

7. The device as recited in claim 2, wherein at least one connecting element of at least one of the first and second sensors has at least one bending region for compensating for voltages resulting from thermal stress.

8. The device as recited in claim 7, wherein the at least one connecting element of the at least one of the first and second sensors has at least one further bending region for guiding the at least one connecting element to the printed circuit board for electrical contacting.

9. The device as recited in claim 8, further comprising:
at least one retaining element provided for the sensor.

10. The device as recited in claim 9, wherein the at least one retaining element is configured in the form of ribs one of (i) on the housing or (ii) on a part connected to the housing.

11. The device as recited in claim 7, wherein at least one pocket is provided in the housing for accommodating at least one of the first and second sensors.

12. The device as recited in claim 7, wherein at least one of the first and second sensors is situated to sense the at least one magnet's magnetic field extending essentially parallel to the rotational axis of one of the steering wheel or the steering column.

13. The device as recited in claim 7, wherein at least one fastening arrangement is provided in the housing for connecting the printed circuit board to the housing.

14. The device as recited in claim 13, wherein the fastening arrangement is thermally deformable for fastening the housing to the printed circuit board.

15. The device as recited in claim 13, wherein the fastening arrangement is configured as at least one rivet connection.

16. The device as recited in claim 1, further comprising a hub integrated with the magnet in the housing.

17. A device for detecting a relative rotational angle of one of a steering wheel or a steering column of a vehicle, comprising:
at least one magnet;
at least one first sensor configured to detect the magnetic field of the magnet, and wherein the magnet and the first sensor are movably situated relative to one another, the first sensor detecting a relative rotational angle of the steering column;
at least one housing, wherein at least one of the magnet and the first sensor is situated in the housing;
at least one printed circuit board contacted in an electrically conductive manner by at least one connecting element of the first sensor, the printed circuit board having one of an interface or a connector plug;
an evaluation unit situated at a distance from the housing, wherein one of an output signal of the first sensor or a signal derived from the output signal of the first sensor is relayed from the one of the interface or the connector plug of the printed circuit board to the evaluation unit, and wherein the evaluation unit is configured to ascertain the absolute position of the rotational angle of the one of the steering wheel or the steering column as a function of the output signal of the first sensor; and
a second sensor configured to detect the magnetic field of the magnet, the second sensor being situated at a distance from the first sensor and outputting an output signal phase-shifted with respect to the output signal of the first sensor, wherein the at least one printed circuit board includes at least one linkage unit which gates the two output signals of the first and second sensors to form a gated output signal.

* * * * *